April 20, 1965    J. BUFFET    3,178,920

METHOD OF HOT EXTRUSION OF HOLLOW SECTIONS

Filed May 21, 1963    3 Sheets-Sheet 1

April 20, 1965

J. BUFFET 3,178,920

METHOD OF HOT EXTRUSION OF HOLLOW SECTIONS

Filed May 21, 1963

United States Patent Office 3,178,920
Patented Apr. 20, 1965

3,178,920
METHOD OF HOT EXTRUSION OF
HOLLOW SECTIONS
Jean Buffet, Beaumont-sur-Oise, France, assignor to Societe Anonyme: Compagnie du Filage des Metaux et des Joints Curty (CEFILAC), Paris, France, a corporation of France
Filed May 21, 1963, Ser. No. 281,963
Claims priority, application France, May 22, 1962, 898,407; Mar. 29, 1963, 929,825
3 Claims. (Cl. 72—42)

The present invention relates to a method of hot extruding hollow metal sections, such as tubes or hollow bars.

According to the conventional known methods, the inner part of the hollow product is shaped by inserting a mandrel member inside the billet. In practice, two main embodiments of this method are used:

(a) A cylindrically shaped mandrel which is integral with the punch, and has a length at least equal to that of the billet is used. An initial bore, adjusted to the shape of the desired products, is then formed in each billet. For producing inner shaped tubes, the suitable form of said mandrel is obtained only through a substantially complex and costly operation.

(b) A cylindrically shaped, stationary mandrel member may be used, having a circular cross-section and a comparatively large diameter carrying at its front end a mandrel head of a similar cross-section to that of the inner shape desired. This embodiment, termed "stationary mandrel extrusion," presents the advantage of requiring but a reduced number of bores in the billets, yet starting from hollow products having a large bore, which is generally quite readily obtainable. In such a method however, certain difficulties occur and include securing the mandrel head piece onto the mandrel member by skew or warped metal surfaces which have a generally complex construction, efficient lubrication of the mandrel head and the protection thereof against heating is also a problem. Thus, the use of the stationary-mandrel extrusion method, as presently practiced, is also substantially costly, especially on account of the rapid wear of the mandrel head piece.

Lately, the hot extrusion operations of metals, even of the more complex shapes, is being generally carried out with lubricants which become gradually viscous under the effect of the temperature. It is an object of this invention to provide an improvement of this extrusion method which, under suitable technical and economical conditions, yields high-quality extruded products, either solid, or hollow.

To develop the advantages of the stationary-mandrel extrusion method, I have focussed my research work on obtaining hollow section material and tubes of a small diameter, the lengths of such tubes, as presently achieved, being limited by the life of both the extrusion mandrel member and the mandrel head piece. My invention comprises use of a lubricant, which is solid at normal temperature and adapted to be squeezed into the connecting area formed between said mandrel member and said mandrel head piece.

Accordingly, the novel method of hot extruding hollow sections and tubes by a stationary mandrel member fitted with an extruding mandrel head-piece consists essentially in placing around said mandrel head-piece, in the zone of its junction to the mandrel member, a mass of solid material which presents a viscosity range, and in subsequently running the extrusion operation. The mass of solid material ensures both continuity of the junction between mandrel member and mandrel head-piece through deformation under the influence of the compression of the billet, and lubrication during the extrusion operation by melting down partly or totally at the temperature of the operation.

Preferably, the solid mass is ring shaped, i.e. in the shape of a cylinder or a frustated cone, formed with a bore of a shape closely similar to the outer shape of said extrusion mandrel head piece.

Preferably, also, the mass of solid material is a vitrious substance consisting of mixtures of oxides, salts, slags and the like. This material may be applied as a solid block, a pad of agglomerated powder fibers or a spongy mass. It may be desirable to facilitate maintaining this mass in position by pre-shaping the front end of the billet bore, thus causing the lubricant to be clamped in position between the mandrel head piece, the front face of the mandrel member and the interior walls of the billet which define the bore, so that a pre-compression applied prior to extrusion provide the junction desired. In order to impart a suitable shape to the front end of the billet bore, it is possible either to carry out, for instance, a preliminary expansion operation, stopping short of emerging, or a machining operation, or else to secure to the front end of the billet a metal piece of revolution, having the desired internal and external shapes.

In order to further improve the performance of the mandrel and the extrusion quality, and according to another feature of the invention, it is desirable to provide a torus-like junction between the plane front surface of the mandrel member and the cylindrical side surface thereof, while maintaining the sharp angle between said plane front surface of the mandrel member and the peripheral surface of the mandrel head.

The radius of the torus-shaped junction is preferably comprised between approximately 2 and 5 mm.

In the accompanying drawings I have shown two preferred embodiments of my invention in which.

Figure 1:
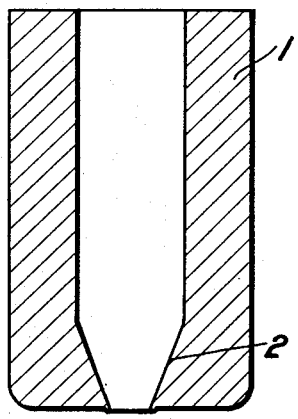
FIGURE 1 is a cross-sectional view of a billet prepared to be extruded in accordance with the method of the invention.

Referring to the drawings, billet 1 illustrated in FIGURE 1 has a frusto-conical bore 2 formed on the front face of the inside of the piece.

Figure 2:
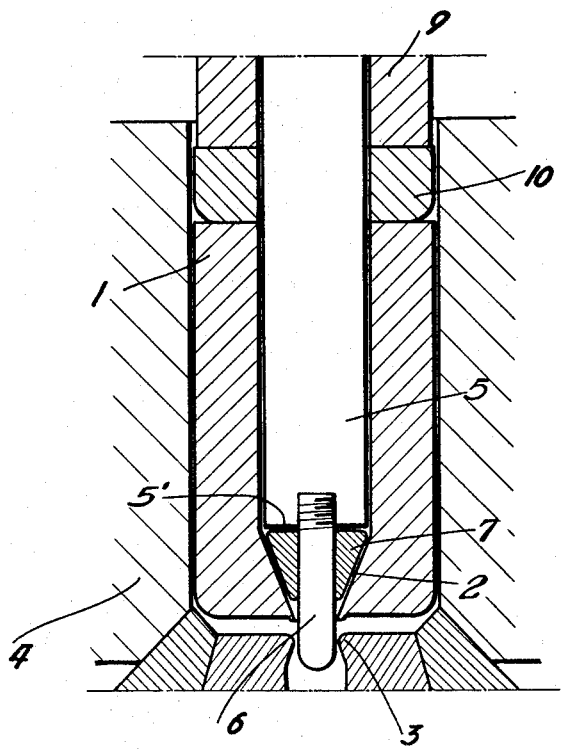
FIGURES 2 and 3 are cross-sectional views of a container with a billet loaded in it, prior to the precompression preceding the extrusion and during the extrusion operation, respectively.

In FIGURE 2, there is shown a die 3 and the container 4, wherein billet 1 is located, with a slight clearance, and into the bore of which engages the cylindrical mandrel member 5 with its mandrel head piece 6. According to the invention, the lubricating material formed into a truncated-cone shape 7 surrounds the mandrel head piece 6 and fills up the area defined by the tapered bore 2 and the front face 5' of mandrel member 5.

Figure 3:
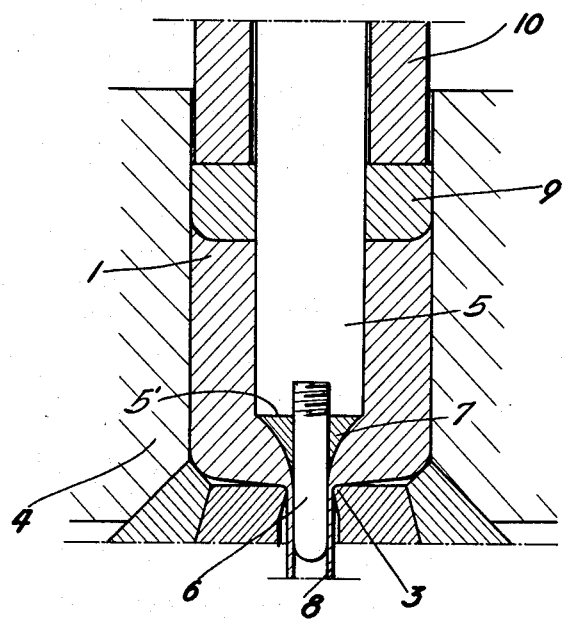

The extrusion operation is effected after applying, in a known manner, in order to completely fill up the container 4, a pre-compression on billet 1 by means of a punch 9 through a dummy or thrust block 70. The truncated-cone lubricant 7 protects a junction between the mandrel member 5 and the mandrel head piece 6 and provides the lubrication thereof on flowing. As shown in FIGURE 3 the extruded tube is identified as the element 8 whose bore diameter is less than the bore diameter of the billet 1.

Figure 4:
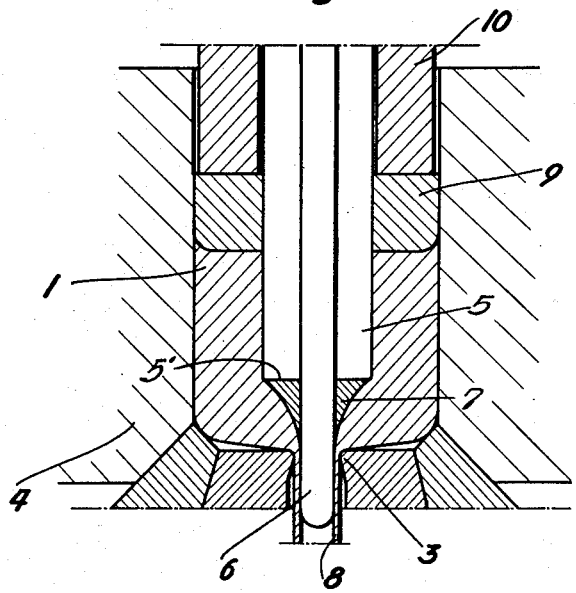
FIGURE 4 is a fragmentary view of an alternating form of applying the method of the invention, wherein the mandrel head piece is moved.

In the alternative embodiment illustrated in FIGURE 4, the mandrel head piece 6 is movable, in a known manner, inside the stationary extrusion mandrel member 5, thus enabling to considerably increase the extruded length 8. Of course, it is possible, to further facilitate the operations, by lubricating, in a known way, said container and said billet.

Figure 5:
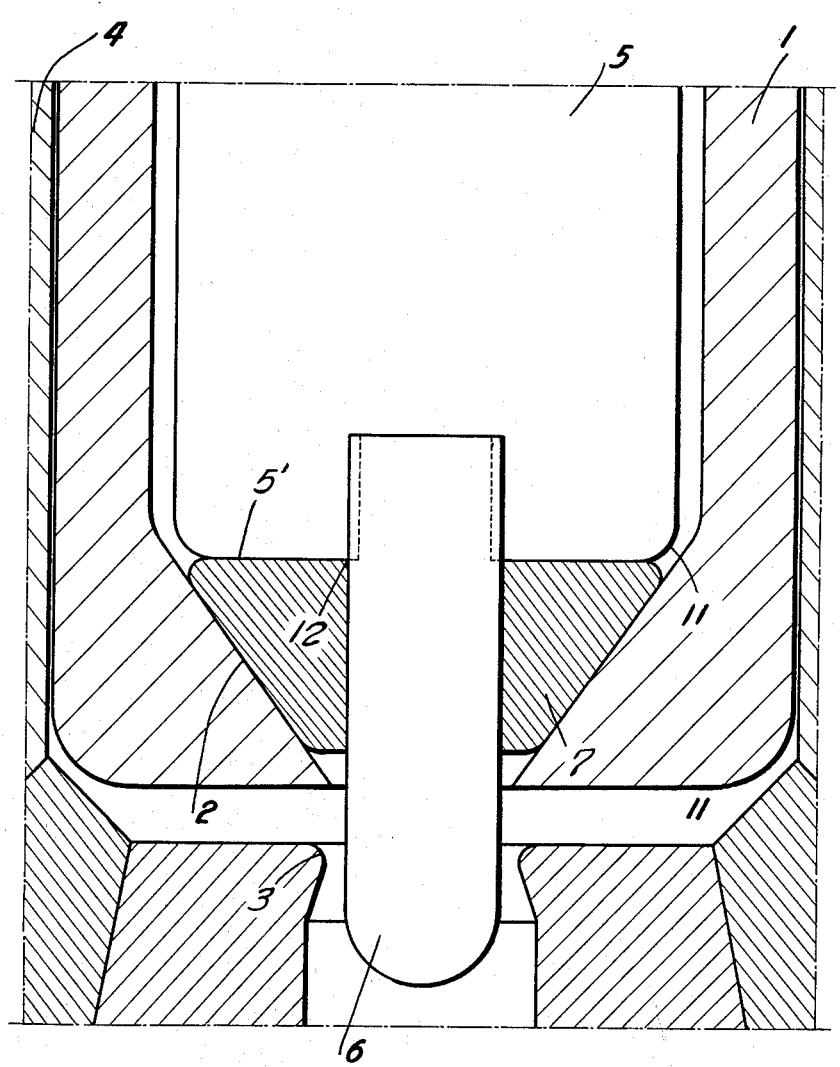
FIGURE 5 is a fragmentary cross-sectional view, on an enlarged scale, of a loaded container, with a mandrel member having a torus-shaped junction.

In the alternative embodiment according to FIGURE 5, a torus-shaped junction 11 is formed between the front surface 5' of the mandrel member 5 and the peripheral cylindrical surface thereof, and a sharp angle 12 is maintained between said face 5' and the peripheral surface of the mandrel head piece 6.

By way of a practical example, 18-8 steel billets, having an external diameter of 143 mm. and a length of 500 mm. bored to a diameter of 65 mm, were extruded according to the invention. The truncated-cone shape of the front face of the bore of each billet was obtained by stopping, towards the end of the operation, the expansion to the diameter of 65 mm. from the initial bore of 20 mm.

The container presented a diameter of 148 mm. and a length of 750 mm. The diameter of the die used was equal to 27 mm. In a first series of operations, the stationary mandrel member (FIGURE 2) had a diameter of 60 mm.; and in a second series of operations a stationary mandrel member was used, in accordance with that illustrated in FIGURE 5, with a diameter of 60 mm. and a torus-shaped junction of a radius of 4 mm. and a sharp angle between the front face and the peripheral surface of the mandrel head piece. In both of these series of operations, the mobile head piece had a diameter of 20.3 mm. and a length of 350 mm. Also in both of these series of operations, the lubricating mass was glass powder agglomerated with water glass and formed a truncated-cone, 25 mm. high, with a front diameter of 24 mm., a rear diameter of 60 mm. and a bore of 24 mm. The extrusion was achieved under a pressure of 85 kg./sq. mm. and the mandrel head piece moved, during the extrusion, over 250 mm. Under these conditions, a tube was obtained having a length of 27 m., an inner diameter of 20 mm., a thickness of 3 mm.; and moreover, the inner and outer surfaces of the tube did not show any defects.

The mandrel head piece was used for 20 operations, with the arrangement shown in FIGURE 2 and for 25 operations with the arrangement shown in FIGURE 5. This latter improvement is due to the torus-shaped junction, which facilitates the flow of the extruded material, and avoids occurrence of any excessive heating on a sharp edge which results in the rapid wear thereof. Sometimes this rapid wear is due to a certain degree to pollution of the extruded piece by particles of the metal forming the mandrel member, and carried along therewith. On the other hand, the maintenance of the sharp angle between the plane front surface of the mandrel member and the peripheral surface of the mandrel head piece does not affect the materials in contact in said region, which are all substantially at the same temperature.

By extruding according to the method with a mobile mandrel integral with the punch, under the previously known conditions, only 12 m. of tube length were obtained, the mandrel member being replaced after only ten operations.

What I claim is:

1. In a method of extruding hollow metal sections and tubes from a billet which has a bore extending along its longitudinal axis by compressing said billet in an extrusion press having a punch and a stationary extrusion mandrel member provided with a coaxial mandrel head of a diameter different from that of said mandrel member and substantially equal to that of the bore of the hollow sections to be extruded, said bore of the hollow sections to be extruded having a different dimension than said bore of said billets, the steps comprising forming in the leading portion of said bore of said billet a frusto-conical chamber which opens into the front face of said billet and which flares outwardly and rearwardly from said front face, placing around said mandrel head in said chamber in the zone of its junction to said mandrel member and in the space between the front face of the mandrel member and the inner wall of said chamber a mass of a solid material which melts at least partially while remaining viscous and is shaped to fill at least partially said chamber at the extrusion temperature when subjected to compression by said punch and, thereafter, extruding said billet to produce a hollow product whose bore dimension is different from the bore dimension of said billet, said mass providing lubrication of said mandrel head during said extruding.

2. The method of claim 1 characterized by using a mandrel which has a torus-shaped junction between its front face and its peripheral side walls.

3. The method of claim 1 characterized by said material being selected from the group consisting of oxides, salts, slags, glasses, fibers, agglomerated powders and spongy masses.

References Cited by the Examiner

UNITED STATES PATENTS

| 567,410 | 9/96 | Potter | 207—10.1 |
| 1,771,620 | 7/30 | Ehrmann | 207—10.21 |
| 1,854,411 | 4/32 | Leighton | 207—3 |
| 2,946,437 | 7/60 | Edgecombe | 207—10.1 |

FOREIGN PATENTS

| 195,013 | 3/23 | Great Britain. |

CHARLES W. LANHAM, *Primary Examiner.*

MICHAEL V. BRINDISI, *Examiner.*